(12) United States Patent
Lee

(10) Patent No.: US 12,452,891 B2
(45) Date of Patent: Oct. 21, 2025

(54) APPARATUS AND METHOD FOR ASSIGNING A TASK IN AN AI/ML JOB

(71) Applicant: ELECTRONICS AND TELECOMMUNICATIONS RESEARCH INSTITUTE, Daejeon (KR)

(72) Inventor: Soohwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 484 days.

(21) Appl. No.: 18/097,643

(22) Filed: Jan. 17, 2023

(65) Prior Publication Data

US 2023/0232434 A1  Jul. 20, 2023

(30) Foreign Application Priority Data

Jan. 17, 2022 (KR) .......................... 10-2022-0006678
Jan. 17, 2023 (KR) .......................... 10-2023-0006534

(51) Int. Cl.
*H04W 24/00* (2009.01)
*H04W 24/08* (2009.01)
*H04W 72/51* (2023.01)
*H04W 72/54* (2023.01)

(52) U.S. Cl.
CPC .......... *H04W 72/51* (2023.01); *H04W 24/08* (2013.01); *H04W 72/54* (2023.01)

(58) Field of Classification Search
CPC ................. H04W 72/51; H04W 72/54; H04W 24/00–08; H04W 72/50–569; G05B 13/00–048; G06N 20/00–20
See application file for complete search history.

(56) References Cited

U.S. PATENT DOCUMENTS

| 8,181,195 | B2 | 5/2012 | Sardera | |
| 2014/0331235 | A1* | 11/2014 | Lee | G06F 9/5027 718/104 |
| 2021/0037113 | A1* | 2/2021 | Wang | G06F 9/4887 |
| 2021/0306231 | A1 | 9/2021 | Lee et al. | |
| 2022/0108214 | A1 | 4/2022 | Lee et al. | |

\* cited by examiner

*Primary Examiner* — Ronald Eisner
(74) *Attorney, Agent, or Firm* — LRK PATENT LAW FIRM

(57) ABSTRACT

A method and apparatus for performing AI/ML job through the steps of: receiving expected completion time and available resources of UE for a plurality of candidate combinations of a plurality of tasks included in a job from the UE via a cellular network; determining a candidate combination from among the plurality of candidate combinations based on the expected completion time and available resources of the UE for the plurality of candidate combinations; and assigning a task according to determined candidate combination to the UE through a PDU session of the cellular network.

20 Claims, 6 Drawing Sheets

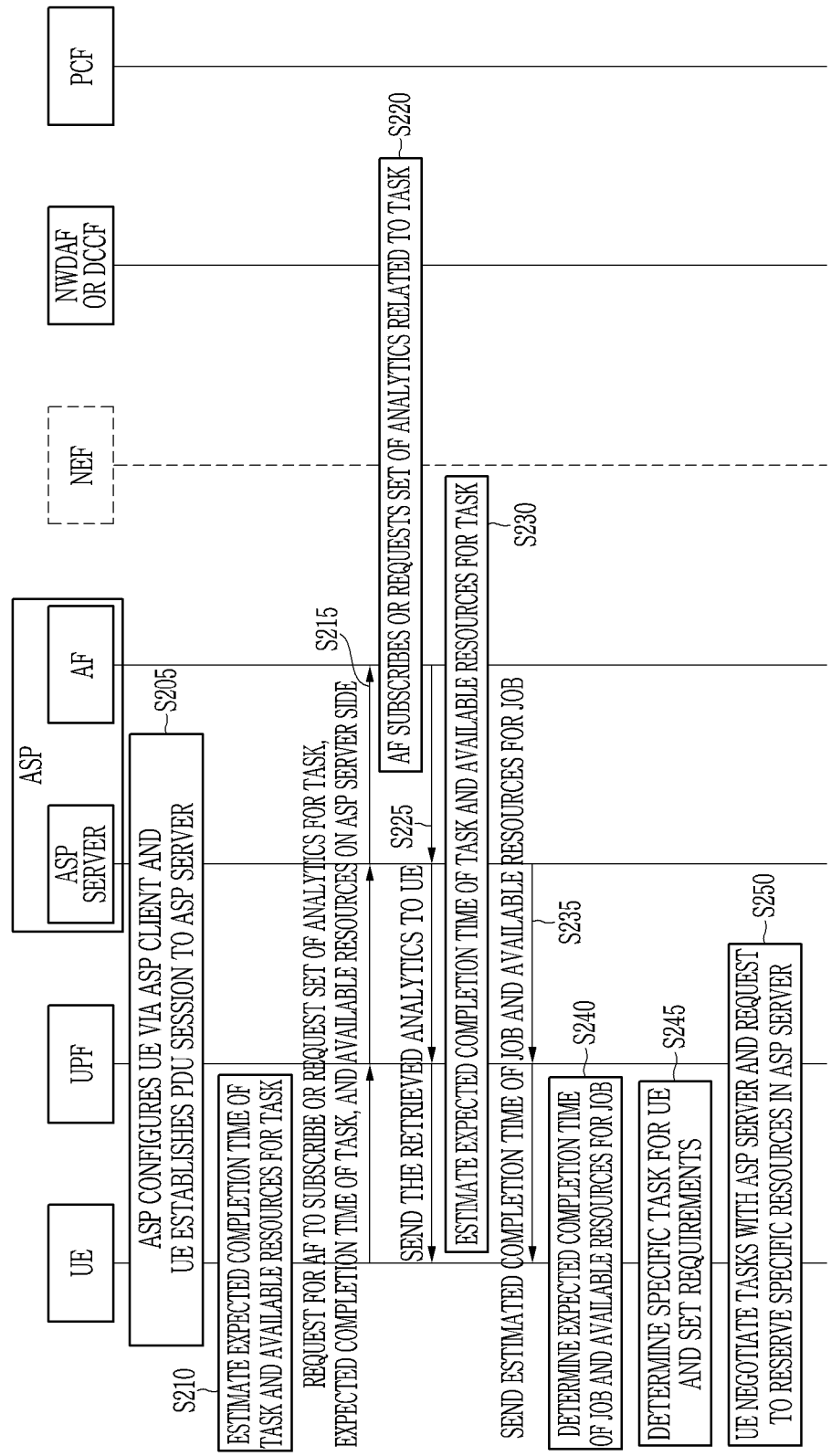

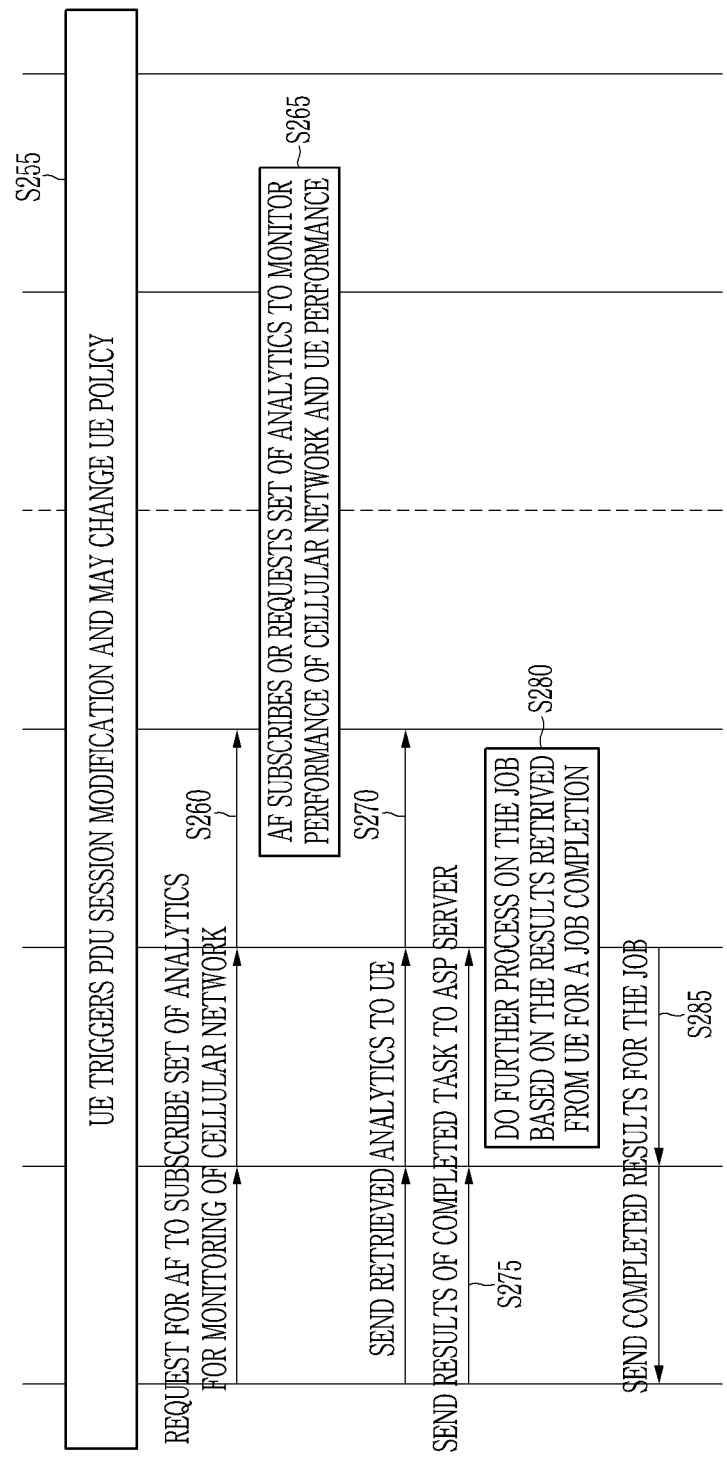

APPARATUS AND METHOD FOR ASSIGNING A TASK IN AN AI/ML JOB

CROSS-REFERENCE TO RELATED APPLICATIONS

This application claims priority to and the benefit of Korean Patent Application No. 10-2022-0006678 filed in the Korean Intellectual Property Office on Jan. 17, 2022, and Korean Patent Application No. 10-2023-0006534 filed in the Korean Intellectual Property Office on Jan. 17, 2023, the entire contents of which are incorporated herein by reference.

BACKGROUND

1. Technical Field

This disclosure relates to methods and apparatus for performing AI/ML job.

2. Description of Related Art

With the rapid development of machine learning (ML) and artificial intelligence (AI) technology, demand for AI/ML services performed by user equipment (UE) of mobile communication systems is increasing. However, methods supporting increasing UE machine learning and AI services in mobile communication systems have not yet been developed. Particularly, in order to achieve the latency minimization required in many AI services and training, the help of the mobile communication network is needed.

SUMMARY

Embodiments provide a method for performing an AI/ML job.

Embodiments provide another method for performing an AI/ML job.

Embodiments provide an apparatus for performing an AI/ML job.

According to an embodiment, a method for performing an AWL job is provided. The method includes: receiving expected completion time and available resources of user equipment (UE) for a plurality of candidate combinations of a plurality of tasks included in a job from the UE via a cellular network; determining a candidate combination from among the plurality of candidate combinations based on the expected completion time and available resources of the UE for the plurality of candidate combinations; and assigning a task according to determined candidate combination to the UE through a protocol data unit (PDU) session of the cellular network.

In an embodiment, the method may further include receiving analytics related to the plurality of tasks from the cellular network.

In an embodiment, the analytics may include at least one of UE mobility, UE communication, UE data congestion, NF (network function) load, network performance, observer service experience, QoS (quality of service) sustainability, WLAN performance, and DN (data network) performance.

In an embodiment, the determining a candidate combination from among the plurality of candidate combinations based on the expected completion time and available resources of the UE for the plurality of candidate combinations may include estimating the expected completion time of the AI/ML job based on the expected completion time for the plurality of candidate combinations, available resources of the UE, and the analytics.

In an embodiment, the determining a candidate combination from among the plurality of candidate combinations based on the expected completion time and available resources of the UE for the plurality of candidate combinations may further include determining the candidate combination from among the plurality of candidate combinations based on estimated expected completion time of the AI/ML job.

In an embodiment, the method may further include requesting a policy change to complete the AI/ML job within a predetermined latency to a policy control function (PCF) in the cellular network.

In an embodiment, the method may further include modifying the PDU session to change a policy for completing the AI/ML job within a predetermined latency.

In an embodiment, the receiving expected completion time and available resources of UE for a plurality of candidate combinations of a plurality of tasks included in a job from the UE via a cellular network may include receiving at least one of hardware specification of the UE, a hardware model ID of the UE, and an operating system ID and version of the UE from the UE.

According to another embodiment, a method for performing an artificial intelligence (artificial intelligence, AI)/machine learning (ML) job is provided. The method includes: receiving expected completion time and available resources of an application service provider (ASP) server for a plurality of candidate combinations of a plurality of tasks included in an AI/ML job from the ASP server via a cellular network; determining a candidate combination from among the plurality of candidate combinations based on the expected completion time and the available resources of the ASP server for the plurality of candidate combinations; and assigning a task determined according to the candidate combination to the ASP server through a protocol data unit (PDU) session of the cellular network.

In an embodiment, the receiving expected completion time and available resources of an application service provider (ASP) server for a plurality of candidate combinations of a plurality of tasks included in an AI/ML job from the ASP server via a cellular network comprises receiving expected completion time and available resource of the ASP server for a plurality of candidate combinations of some of the plurality of tasks from the ASP server.

In an embodiment, the method may further include receiving analytics for monitoring performance of the cellular network from the cellular network.

In an embodiment, the analytics includes at least one of UE mobility, UE communication, UE data congestion, NF (network function) load, network performance, observer service experience, QoS (quality of service) sustainability, WLAN performance, and DN (data network) performance.

In an embodiment, the determining a candidate combination from among the plurality of candidate combinations based on the expected completion time and the available resources of the ASP server for the plurality of candidate combinations may include estimating expected completion time of the AI/ML job based on the expected completion time and the available resources of the ASP server for the plurality of candidate combinations and the analytics.

In an embodiment, the determining a candidate combination from among the plurality of candidate combinations based on the expected completion time and the available resources of the ASP server for the plurality of candidate combinations may further include determining the candidate combination from among the plurality of candidate combinations based on estimated expected completion time of the AWL job.

In an embodiment, the method may further include requesting a change of a policy for a policy control function (PCF) in the cellular network to complete the AI/ML job within a predetermined latency.

In an embodiment, method may further include modifying the PDU session to change a policy for completing the AI/ML job within a predetermined latency.

In an embodiment, the receiving expected completion time and available resources of an application service provider (ASP) server for a plurality of candidate combinations of a plurality of tasks included in an AI/ML job from the ASP server via a cellular network may include receiving at least one of hardware specification of the ASP server and a hardware model ID of the ASP server from the ASP server.

According to yet another embodiment, an apparatus for performing an artificial intelligence (AI)/machine learning (ML) job is provided. The apparatus includes: a processor, a memory, and a communication device, wherein the processor executes a program stored in the memory to perform: receiving expected completion time and available resources of an application service provider (ASP) server for a plurality of candidate combinations of a plurality of tasks included in an AI/ML job from the ASP server via a cellular network; determining a candidate combination from among the plurality of candidate combinations based on the expected completion time and the available resources of the ASP server for the plurality of candidate combinations; and assigning a task determined according to the candidate combination to the ASP server through a protocol data unit (PDU) session of the cellular network.

In an embodiment, the processor may execute the program to further perform receiving analytics for monitoring performance of the cellular network from the cellular network, and the analytics may include at least one of UE mobility, UE communication, UE data congestion, NF (network function) load, network performance, observer service experience, QoS (quality of service) sustainability, WLAN performance, and DN (data network) performance.

In an embodiment, the processor may execute the program to further perform requesting a change of a policy for a policy control function (PCF) in the cellular network to complete the AI/ML job within a predetermined latency; or modifying the PDU session to change the policy for completing the AI/ML job within the predetermined latency.

According to yet another embodiment, an apparatus for performing an artificial intelligence (AI)/machine learning (ML) job, the apparatus comprising is provided. The apparatus comprises: a processor, a memory, and a communication device, wherein the processor executes a program stored in the memory to perform: determining a candidate combination from among a plurality of candidate combinations of a plurality of tasks included in the AI/ML job based on expected completion time and available resources for the plurality of candidate combinations; assigning a task determined according to the candidate combination to user equipment (UE) through a protocol data unit (PDU) session of the cellular network; and transmitting a policy required for the UE to process the task to a policy control function (PCF) in the cellular network.

In an embodiment, the processor may execute the program to further perform receiving expected completion time and available resources of the UE for at least one candidate combination of the plurality of candidate combinations from the UE.

In an embodiment, when determining a candidate combination from among a plurality of candidate combinations of a plurality of tasks included in the AI/ML job based on expected completion time and available resources for the plurality of candidate combinations, the processor may execute the program to perform determining the candidate combination based on analytics received from the cellular network, the expected completion time and available resources of the UE, and expected completion time and available resources of an application service provider (ASP) server for remaining candidate combinations excluding the at least one candidate combination of the plurality of candidate combinations.

BRIEF DESCRIPTION OF THE DIAGRAMS

FIGS. 4A and 4B is a flowchart illustrating a method for estimating job completion time and assigning tasks by the UE according to an embodiment.

DETAILED DESCRIPTION OF THE EMBODIMENTS

Figure 1:
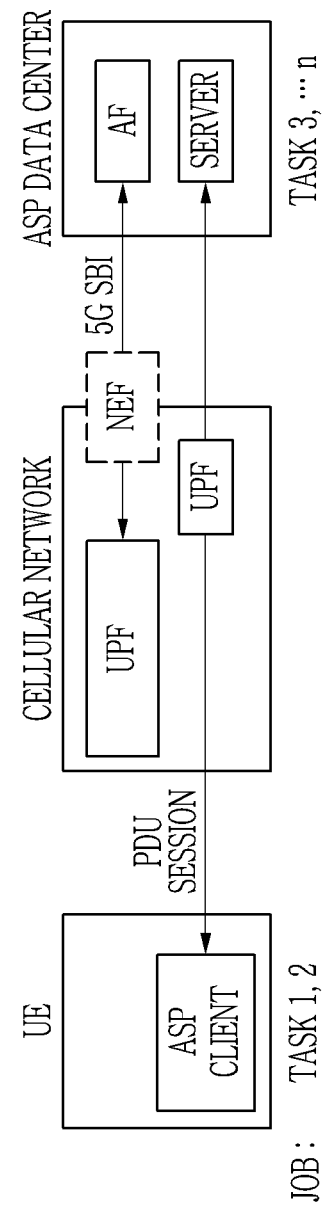
FIG. 1 is a diagram illustrating a coordination between UE and an ASP through a cellular network according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, user equipment (UE) may be called a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a diagram illustrating a coordination between UE and an ASP through a cellular network according to an embodiment.

As demands for artificial intelligence (AI) and machine learning (ML) services on devices increases, servers of the application service provider (ASP) require high speed collaboration between the devices and the ASP server. However, there are limitations according to the computing power of the devices. For coordination between UE (user equipment) and the ASP server through the cellular network, the following describes an architecture and method in which the UE, the cellular network, and the ASP server can cooperate with each other to support the AI/ML services.

In an embodiment, an ASP client in the UE and the APS server of the ASP data center may communicate with each other and coordinate. Referring to FIG. 1, the ASP client in the UE and the ASP server of the ASP data center may be connected by the protocol data unit (PDU) session of the cellular network. In addition, an AF (application function) of the ASP data center may be connected to the cellular network by utilizing a network function (NF) service of the cellular network through a 5G service-based interface (SBI).

Figure 2:
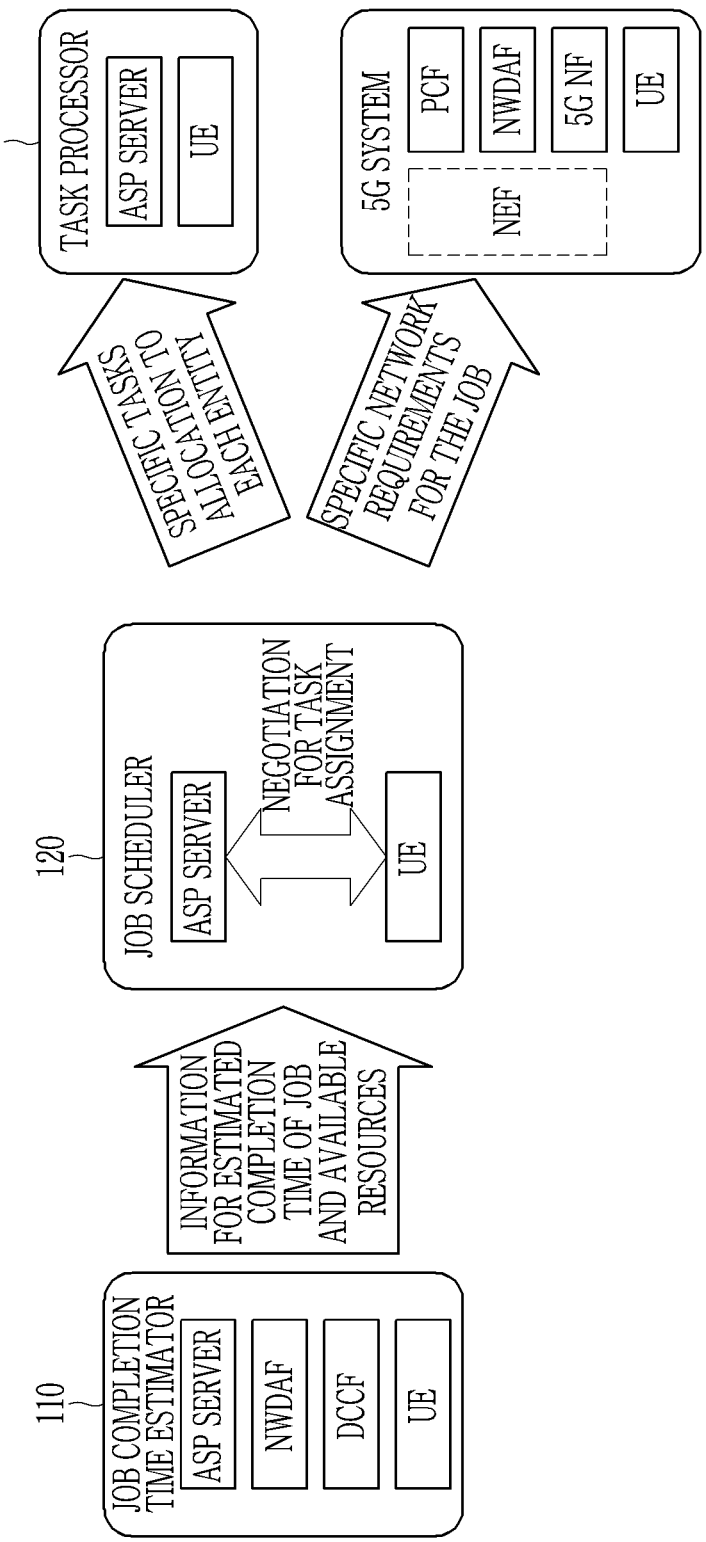
FIG. 2 is a schematic diagram illustrating a method for performing a job for AI/ML service according to an embodiment.

FIG. 2 is a schematic diagram illustrating a method for performing a job for AI/ML service according to an embodiment.

In an embodiment, a job for the AI/ML service may be divided into a plurality of tasks and the plurality of tasks composing one job may be performed by the UE and the ASP server. Here, the job for the AI/ML service may include, for example, producing of inference via the ML model, update of the ML model, and the like.

In an embodiment, the plurality of tasks may be executed sequentially to complete one job. For example, the UE may execute tasks from a first layer to a third layer and transmit the result of the task processed in the third layer to the ASP server, and then tasks for other layers may be executed by the ASP server.

In an embodiment, the plurality of tasks may include, for example, data sourcing, processing each layer of a neural network, making inference in a neural network, and the like. In addition, the plurality of tasks may include calculation of gradient for ML model update in each device, aggregation of the gradients from each UE, and the like in federated learning.

In an embodiment, an AI/ML operation may require a strict latency for job completion, and since the latency is expected to be several milliseconds, it needs to be checked whether the latency required for the job can be met before the job is assigned to the UE and ASP server. That is, before the job is assigned to the UE and ASP server, the possibility of whether the resources of the UE and ASP server required for task completion, the policy of the cellular system, and the like are adjusted and the latency requirement for the job can be met needs to be checked in advance.

Referring to FIG. 2, the AWL job system 100 according to an embodiment may include a job completion time estimator 110, a job scheduler 120, and a task processor 130.

The job completion time estimator 110 may be included in the UE and ASP server. Alternatively, the job completion time estimator 110 may be included in a network function (e.g., network data analytics function (NWDAF), data collection coordination function (DCCF), etc.) in the cellular network.

The job completion time estimator 110 may generate information for estimating the job completion time and monitor available resources for the job. Thereafter, the job completion time estimator 110 may transmit job-related information to the job scheduler 120. In an embodiment, the job-related information transmitted to the job scheduler 120 by the job completion time estimator 110 may include at least one of analytics generated by the NWDAF in the cellular network, estimated completion time of each task to be executed on the UE and ASP server, available resources for the job of the UE, ASP server, and the cellular network, and expected network delay.

The job scheduler 120 may check the completion possibility of a job having a specific latency based on job-related information transmitted from the job completion time estimator 110 and assign a plurality of tasks to the UE and ASP server. In addition, the job scheduler 120 may request the cellular network to modify the PDU session for the job and policy related to the UE.

The task processor 130 in the UE and ASP server may execute tasks assigned by the job scheduler 120. If the execution order of each task is predetermined by the job scheduler 120, the task processor 130 in the UE and ASP server may execute the task according to the predetermined order and exchange the completion result of each task assigned to the UE and ASP server between the UE and ASP server.

In an embodiment, if the job scheduler 120 requests network requirements for the job from the cellular network, the cellular network may add/change the NF capable of supporting the policy and job for the UE through a policy control function (PCF). In addition, the cellular network may re-assign network resources to the UE and a NF that supports the job.

Figure 3:
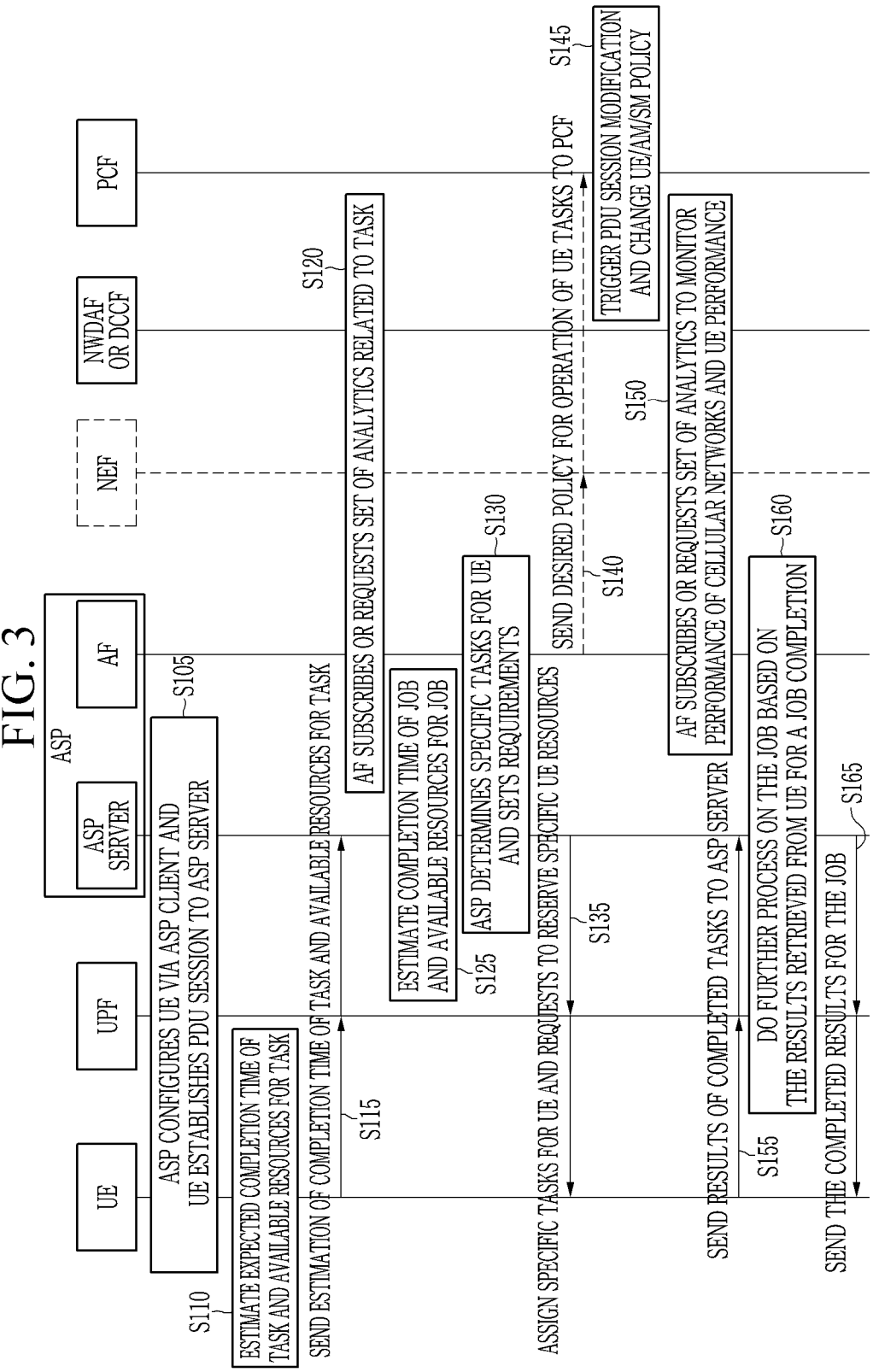
FIG. 3 is a flowchart illustrating a method for estimating job completion time and assigning tasks by the ASP server according to an embodiment.

FIG. 3 is a flowchart illustrating a method for estimating job completion time and assigning tasks by the ASP server according to an embodiment.

Referring to FIG. 3, the UE may be configured by the ASP client to support the AI/ML job and the UE may establish a PDU session to communicate with the ASP server (S105). Information to be configured in the UE for the AI/ML job may include at least one of an IP address of the ASP server, application programming interface (API) for the ASP server that supports the AI/ML job, candidate combinations of tasks to be done at the UE for the AI/ML job, and AI/ML models for the AI/ML job. When an AI/ML job is divided into n tasks, the number of candidate combinations of tasks to be processed in the UE may be equal to equation 1.

The number of candidate combinations of
tasks=$_nC_1+_nC_2+\ldots+_nC_n$ (Equation 1)

Thereafter, the UE may estimate expected completion time of the task and available resources for the task (S110). In an embodiment, the UE may determine all candidate combinations of tasks for AI/ML job and calculate expected completion times and available resources for each candidate combination. The UE may monitor required information as configured in the ASP client to calculate the expected completion time of the task and available resources.

In an embodiment, the ASP may collect information for estimating the expected completion time and available resources of the AI/ML job from the UE and the cellular network.

Referring to FIG. 3, the ASP server of the ASP may receive the expected completion time of the task and the available resource through the PDU session from the UE (S115). The UE may send at least one of hardware specifications of the UE (e.g., processor model ID, RAM capacity, etc.), a hardware model ID of the UE (e.g., APPLE iPhone 13, etc.), and an ID and version of the operating system (OS) of the UE to the ASP server.

The AF may subscribe or request a set of analytics related to the task from the NF of the cellular network (S120). In order for the AF to subscribe or request the set of analytics, a service provided by the NWDAF or DCCF (e.g., Nnwdaf_AnalyticsSubscription_Subscribe) may be used. Nnwdaf_AnalyticsSubscription_Subscribe may provide a set of analytics to measure network delay, performance, and available network resources for the AI/ML job. When the AF is in an untrusted domain, the AF may use the NWDAF service or DCCF service via an NEF (network exposure function). When the NWDAF or DCCF generates the requested analytics, the NWDAF or DCCF may transmit the generated analytics to the AF. When AF is in the untrusted domain, the NWDAF or DCCF may send the analytics to the AF via the NEF.

In an embodiment, the AF may subscribe to a plurality of types of analytics set for the NWDAF or DCCF. The set of analytics that the AF requests from the NWDAF or DCCF may include at least one of UE mobility, UE communication, UE data congestion, NF load, network performance, observer service experience, QoS sustainability, WLAN performance, and data network (DN) performance.

Referring to FIG. 3, the ASP may estimate the expected completion time and available resources of the AWL job (S125). The ASP may use the information received from the UE (information on the expected completion time of the task and available resources of the UE) and the analytics provided by the cellular network to determine end-to-end job completion time for the AI/ML job for each candidate combination of divided tasks.

The end-to-end estimated completion time of the AI/ML job may be a sum of, for example, the task running time at the UE, the network delay required to transmit the result of the task completed in the UE from the UE to the ASP server, the running time for the remaining tasks in the ASP server, and the network delay required to transmit the result of the AI/ML job to the UE. In addition, the ASP may estimate available resources for the job in the UE, cellular network, and ASP server.

The ASP may determine the combination of tasks to be divided between the UE and the ASP and the resources required for the task combination based on the expected completion time of the AI/ML job and the estimated available resources (S130). In an embodiment, the ASP may determine a change of a policy to request from the cellular network side in order to complete the AI/ML job within a predetermined latency. The predetermined latency for completion of the AI/ML job may be determined in advance by request of the ASP.

The ASP server may assign the divided task combination to the UE through the PDU Session (S135). In an embodiment, the ASP may reserve ASP resources to process the tasks to be assigned to the ASP server. When a task combination is assigned to the UE, the UE may decide whether to accept the assigned task. If the UE decides to reject the assigned task, the UE may send a rejection message to the ASP server with an indication of the cause of the rejection (e.g., lack of resources, etc.), and the ASP may perform step S130 again.

The AF may request a policy required for the UE to perform the task for the AI/ML job to the cellular network (S140). The AF may transmit the required policy for the UE to the PCF or trigger a policy change for the PCF. In an embodiment, the AF may request a traffic routing policy by using a service such as Npcf_PolicyAuthorization or request QoS required for specific traffic for a specific time duration by using a service such as Npcf_PDTQPolicyControl. When the AF is in the untrusted domain, the AF may trigger policy changes on the PCF by using a service of the NEF such as Nnef_TrafficInfluence, Nnef_PDTQPolicyNegotiation service, and the like.

The PCF may change the policy for the UE and the PDU session by triggering a PDU session modification procedure or other policy update procedure in the cellular network (S145).

In an embodiment, in order for the ASP to monitor the network performance (e.g., network delay) and UE performance, the AF may subscribe a set of analytics to the NWDAF (S150). When AF is in the untrusted domain, AF may subscribe to the NWDAF or DCCF service via the NEF. When the NWDAF or DCCF generates the requested analytics, the NWDAF or DCCF may transmit the analytics to the AF. When AF is in the untrusted domain, the NWDAF or DCCF may send analytics to the AF via the NEF. Subsequently, when the UE completes all assigned tasks, the UE may transmit the result of the completed task to the ASP server through the PDU session (S155).

When the result of the completed task is received from the UE, the ASP server may complete the AWL job by processing the remaining tasks (S160). When the AI/ML job is completed, the ASP server may transmit the result of processing the AI/ML job to the UE (S165).

FIGS. 4A and 4B is a flowchart illustrating a method for estimating job completion time and assigning tasks by the UE according to an embodiment.

Referring to FIGS. 4A and 4B, the UE may be configured by the ASP client to support the AI/ML job and the UE may establish a PDU session to communicate with the ASP server (S205). Information to be configured in the UE for the AI/ML job may include at least one of an IP address of the ASP server, application programming interface (API) for the ASP server that supports the AI/ML job, candidate combinations of tasks to be done at the UE for the AI/ML job, and AI/ML models for the AI/ML job.

Thereafter, the UE may estimate expected completion time of the task of the UE and available resources for the task (S210). In an embodiment, the UE may determine all candidate combinations of tasks for the AWL job and calculate the expected completion times and available resources for each candidate combination. The UE may monitor required information as configured in the ASP client to calculate the expected completion time of the task and available resources.

In order to estimate network delay, the UE may request a set of analytics related to measuring network delay, network performance, and available resources on the network for the AI/ML job to the ASP server. In addition, in order to estimate the ASP processing delay, the UE may request the ASP server to report the expected completion time of the ASP server and available resources for the task (S215).

In an embodiment, when the UE requests the ASP server the expected completion time of the task, the UE may request all combinations of tasks to be collaborated between the UE and the ASP to the ASP. Alternatively, the UE may instruct the ASP to estimate the expected completion time of the task. For example, the UE may request the expected completion time for candidate combinations of some tasks among a plurality of tasks included in an AI/ML job to the ASP. For example, when the candidate combinations configured in the UE among the five tasks composing one job are $\{1, 2\}$ and $\{1, 2, 3\}$, the UE may indicate the ASP server to estimate the expected completion time of $\{4, 5\}$ and $\{3, 4, 5\}$.

In an embodiment, the UE may request the ASP server to subscribe to a set of analytics of a plurality of types for the NWDAF or DCCF. The set of analytics requested by the UE to the NWDAF or DCCF through the ASP server may include at least one of UE mobility, UE communication, UE data congestion, NF load, network performance, observer service experience, QoS continuity, WLAN performance, and data network performance.

The AF in the ASP may subscribe to a service provided by NWDAF or DCCF that provides analytics requested by the UE (e.g., Nnwdaf_AnalyticsSubscription_Subscribe) (S220). The Nnwdaf_AnalyticsSubscription_Subscribe service may provide a set of analytics to measure network latency, performance, and available network resources for the AI/ML job.

When the NWDAF or DCCF generates the requested analytics, the NWDAF or DCCF may transmit the generated analytics to the AF. When the AF is in the untrusted domain, the NWDAF or DCCF may send the analytics to the AF via the NEF.

When the AF receives the analytics from the NWDAF or DCCF, the AF may transmit the received analytics to the UE through the PDU session (S225).

The ASP server may calculate the expected completion time and available resources of the ASP side task (S230) and transmit the expected completion time and available resources for the tasks of the ASP server to the UE through the PDU session (S235). The ASP server may send at least one of hardware specifications of the ASP server (e.g., processor model ID, RAM capacity, etc.), a hardware model ID of the ASP server (e.g., an identifier of the ASP server, etc.), and an operating system (OS) of the ASP server.

In an embodiment, the UE may estimate expected completion time and available resources for the AI/ML job based on the expected completion time and available resources of each task combination calculated by the UE, the expected completion time and available resources of the tasks received from the ASP server, and the set of analytics received from the cellular network (S240). That is, the UE may use the information estimated by the UE, the information received from the ASP server, and the analytics provided by the cellular network to determine end-to-end expected completion time of the AI/ML job for all candidate combinations (or some candidate combinations that the UE is interested in) of the divided tasks.

The end-to-end estimated completion time of the AI/ML job may be a sum of, for example, the task running time at the UE, the network delay required to transmit the result of the task completed in the UE from the UE to the ASP server, the running time for the remaining tasks in the ASP server, and the network delay required to transmit the result of the AI/ML job to the UE. In addition, the UE may estimate available resources for the AI/ML job in the UE, cellular network, and ASP server.

The UE may determine the combination of tasks to be divided between the UE and the ASP and the resources required for the task combination based on the expected completion time of the AI/ML job and the estimated available resources S245. In an embodiment, the ASP may determine a change of a policy to request from the cellular network side in order to complete the AI/ML job within a predetermined latency. The predetermined latency for completion of the AI/ML job may be determined in advance by request of the ASP.

The UE may assign the divided task combination to the UE and to the ASP through the PDU session (S250). In an embodiment, the UE may reserve resources of the UE to process the assigned task. In addition, the UE may request to reserve ASP resources for processing the tasks to be assigned to the ASP server.

When the ASP receives the assignment result of the task combination, the ASP may decide whether or not to accept the assigned task. If the ASP server determines rejection for the assigned task, the ASP server may send a rejection message to the UE with an indication of the cause of the rejection (e.g., lack of resources, etc.), and the UE may perform step S250 again.

The UE may request a policy required for the UE to perform the task for the AI/ML job from the cellular network (S255). The UE may trigger policy modification to implement the policies required for AI/ML job. In an embodiment, the UE may re-evaluate and re-select a UE Route Selection Policy (URSP) for the PDU session selection), or trigger PDU session modification, or trigger other policy update procedures in the cellular system to modify the policy required for AI/ML job.

In an embodiment, in order for the UE to monitor the network performance (e.g., network delay) and the performance of the ASP server, the UE may request the ASP server to subscribe a set of analytics to the NWDAF (S260).

The set of analytics requested by the UE to the NWDAF or DCCF through the ASP server may include at least one of UE mobility, UE communication, UE data congestion, NF load, network performance, observer service experience, QoS continuity, WLAN performance, and data network performance.

The AF in the ASP may subscribe to the NWDAF or DCCF service providing the analytics requested by the UE (e.g., Nnwdaf_AnalyticsSubscription_Subscribe, etc.) (S265). When the AF is in the untrusted domain, the AF may subscribe to the NWDAF or DCCF service via the NEF. If the NWDAF or DCCF generates the requested analytics, the NWDAF or DCCF may transmit the analytics to the AF. When the AF is in the untrusted domain, the NWDAF or DCCF may send the analytics to the AF via the NEF.

The AF may transmit the analytics received from the NWDAF or DCCF to the UE through the PDU session (S270).

Then, when the UE completes all assigned tasks, the UE may transmit the result of the completed task to the ASP server through the PDU session (S275).

When the result of the completed task is received from the UE, the ASP server may complete the AWL job by processing the remaining tasks (S280). When the AI/ML job is completed, the ASP server may transmit the completion result of the AI/ML job to the UE (S285).

As described above, the low latency required in machine learning and AI applications can be satisfied by organically cooperating UE-cellular network-application server. In addition, as the resources of the UE, cellular network, and application server are used efficiently, the overall capacity of the system can be increased and service satisfaction can be greatly improved.

Figure 5:
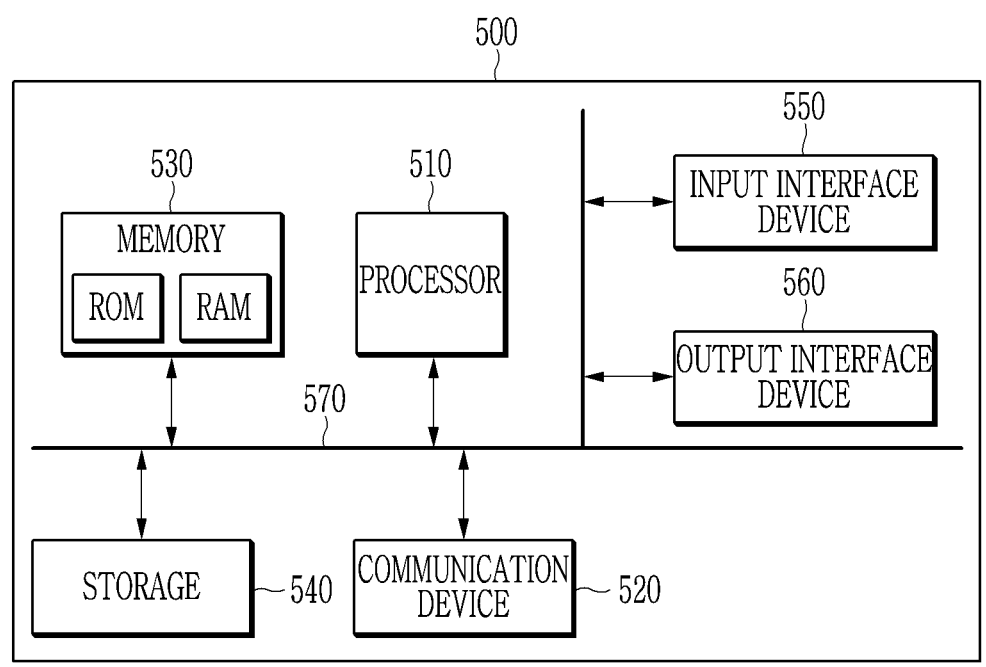
FIG. 5 is a block diagram illustrating UE according to an embodiment.

FIG. 5 is a block diagram illustrating UE according to an embodiment.

The UE according to embodiments may be implemented as a computer system, for example, a computer-readable medium. Referring to FIG. 5, the computer system 500 may include at least one of a processor 510, a memory 530, an input interface device 550, an output interface device 560, and a storage device 540 communicating through a bus 570. The computer system 500 may also include a communication device 520 coupled to the network. The processor 510 may be a central processing unit (CPU) or a semiconductor device that executes instructions stored in the memory 530 or the storage device 540. The memory 530 and the storage device 540 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 520 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments. On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for performing an artificial intelligence (AI)/machine learning (ML) job, the method comprising:
   receiving expected completion time and available resources of user equipment (UE) for a plurality of candidate combinations of a plurality of tasks included in a job from the UE via a cellular network;
   determining a candidate combination from among the plurality of candidate combinations based on the expected completion time and available resources of the UE for the plurality of candidate combinations; and
   assigning a task according to determined candidate combination to the UE through a protocol data unit (PDU) session of the cellular network.

2. The method of claim 1, further comprising
   receiving analytics related to the plurality of tasks from the cellular network.

3. The method of claim 2, wherein:
   the analytics includes at least one of UE mobility, UE communication, UE data congestion, NF (network function) load, network performance, observer service experience, QoS (quality of service) sustainability, WLAN performance, and DN (data network) performance.

4. The method of claim 2, wherein:
   the determining a candidate combination from among the plurality of candidate combinations based on the expected completion time and available resources of the UE for the plurality of candidate combinations comprises
   estimating the expected completion time of the AWL job based on the expected completion time for the plurality of candidate combinations, available resources of the UE, and the analytics.

5. The method of claim 4, wherein:
   the determining a candidate combination from among the plurality of candidate combinations based on the expected completion time and available resources of the UE for the plurality of candidate combinations further comprises
   determining the candidate combination from among the plurality of candidate combinations based on estimated expected completion time of the AI/ML job.

6. The method of claim 1, further comprising:
   requesting a policy change to complete the AI/ML job within a predetermined latency to a policy control function (PCF) in the cellular network.

7. The method of claim 1, further comprising:
   modifying the PDU session to change a policy for completing the AI/ML job within a predetermined latency.

8. The method of claim 1, wherein:
   the receiving expected completion time and available resources of UE for a plurality of candidate combinations of a plurality of tasks included in a job from the UE via a cellular network comprises
   receiving at least one of hardware specification of the UE, a hardware model ID of the UE, and an operating system ID and version of the UE from the UE.

9. A method for performing an artificial intelligence (AI)/machine learning (ML) job, the method comprising:
receiving expected completion time and available resources of an application service provider (ASP) server for a plurality of candidate combinations of a plurality of tasks included in the AI/ML job from the ASP server via a cellular network;
determining a candidate combination from among the plurality of candidate combinations based on the expected completion time and the available resources of the ASP server for the plurality of candidate combinations; and
assigning a task determined according to the candidate combination to the ASP server through a protocol data unit (PDU) session of the cellular network.

10. The method of claim 9, wherein:
the receiving expected completion time and available resources of an application service provider (ASP) server for a plurality of candidate combinations of a plurality of tasks included in the AI/ML job from the ASP server via a cellular network comprises
receiving expected completion time and available resource of the ASP server for a plurality of candidate combinations of some of the plurality of tasks from the ASP server.

11. The method of claim 9, further comprising
receiving analytics for monitoring performance of the cellular network from the cellular network.

12. The method of claim 11, wherein:
the analytics includes at least one of UE mobility, UE communication, UE data congestion, NF (network function) load, network performance, observer service experience, QoS (quality of service) sustainability, WLAN performance, and DN (data network) performance.

13. The method of claim 11, wherein:
the determining a candidate combination from among the plurality of candidate combinations based on the expected completion time and the available resources of the ASP server for the plurality of candidate combinations comprises
estimating expected completion time of the AI/ML job based on the expected completion time and the available resources of the ASP server for the plurality of candidate combinations and the analytics.

14. The method of claim 13, wherein:
the determining a candidate combination from among the plurality of candidate combinations based on the expected completion time and the available resources of the ASP server for the plurality of candidate combinations further comprises
determining the candidate combination from among the plurality of candidate combinations based on estimated expected completion time of the AI/ML job.

15. The method of claim 9, further comprising
requesting a change of a policy for a policy control function (PCF) in the cellular network to complete the AI/ML job within a predetermined latency.

16. The method of claim 9, further comprising:
modifying the PDU session to change a policy for completing the AI/ML job within a predetermined latency.

17. The method of claim 9, wherein:
the receiving expected completion time and available resources of an application service provider (ASP) server for a plurality of candidate combinations of a plurality of tasks included in the AI/ML job from the ASP server via a cellular network comprises
receiving at least one of hardware specification of the ASP server and a hardware model ID of the ASP server from the ASP server.

18. An apparatus for performing an artificial intelligence (AI)/machine learning (ML) job, the apparatus comprising:
a processor, a memory, and a communication device, wherein the processor executes a program stored in the memory to perform:
determining a candidate combination from among a plurality of candidate combinations of a plurality of tasks included in the AI/ML job based on expected completion time and available resources for the plurality of candidate combinations;
assigning a task determined according to the candidate combination to user equipment (UE) through a protocol data unit (PDU) session of the cellular network; and
transmitting a policy required for the UE to process the task to a policy control function (PCF) in the cellular network.

19. The apparatus of claim 18, wherein:
the processor executes the program to further perform
receiving expected completion time and available resources of the UE for at least one candidate combination of the plurality of candidate combinations from the UE.

20. The apparatus of claim 19, wherein:
when determining a candidate combination from among a plurality of candidate combinations of a plurality of tasks included in the AI/ML job based on expected completion time and available resources for the plurality of candidate combinations, the processor executes the program to perform
determining the candidate combination based on analytics received from the cellular network, the expected completion time and available resources of the UE, and expected completion time and available resources of an application service provider (ASP) server for remaining candidate combinations excluding the at least one candidate combination of the plurality of candidate combinations.

\* \* \* \* \*